(12) United States Patent
Kitagawa et al.

(10) Patent No.: US 10,897,945 B2
(45) Date of Patent: Jan. 26, 2021

(54) METHOD FOR MANUFACTURING GLOVE

(71) Applicant: ZEON CORPORATION, Tokyo (JP)

(72) Inventors: Masaru Kitagawa, Chiyoda-ku (JP); Misa Yamamoto, Chiyoda-ku (JP)

(73) Assignee: ZEON CORPORATION, Tokyo (JP)

( * ) Notice: Subject to any disclaimer, the term of this patent is extended or adjusted under 35 U.S.C. 154(b) by 240 days.

(21) Appl. No.: 16/079,287

(22) PCT Filed: Feb. 24, 2017

(86) PCT No.: PCT/JP2017/007226
§ 371 (c)(1),
(2) Date: Aug. 23, 2018

(87) PCT Pub. No.: WO2017/146239
PCT Pub. Date: Aug. 31, 2017

(65) Prior Publication Data
US 2019/0045863 A1 Feb. 14, 2019

(30) Foreign Application Priority Data

Feb. 25, 2016 (JP) .................. 2016-034267
Sep. 30, 2016 (JP) .................. 2016-193433

(51) Int. Cl.
A41H 43/00 (2006.01)
A41D 19/00 (2006.01)
C08F 236/12 (2006.01)
C08F 236/10 (2006.01)
C08J 3/28 (2006.01)
C08K 3/24 (2006.01)
A41D 19/04 (2006.01)
C08L 13/02 (2006.01)
C08K 3/00 (2018.01)
C08F 236/06 (2006.01)
C08J 3/24 (2006.01)
C08K 5/053 (2006.01)
C08K 5/098 (2006.01)
B29C 35/08 (2006.01)
B29C 41/14 (2006.01)
B29K 9/06 (2006.01)
B29K 105/24 (2006.01)
B29L 31/48 (2006.01)

(52) U.S. Cl.
CPC ......... A41H 43/00 (2013.01); A41D 19/0058 (2013.01); A41D 19/04 (2013.01); C08F 236/06 (2013.01); C08F 236/10 (2013.01); C08F 236/12 (2013.01); C08J 3/24 (2013.01); C08J 3/28 (2013.01); C08K 3/00 (2013.01); C08K 3/24 (2013.01); C08K 5/053 (2013.01); C08K 5/098 (2013.01); C08L 13/02 (2013.01); B29C 35/0805 (2013.01); B29C 41/14 (2013.01); B29C 2035/085 (2013.01); B29K 2009/06 (2013.01); B29K 2105/24 (2013.01); B29L 2031/4864 (2013.01); C08F 2810/20 (2013.01); C08K 2201/019 (2013.01)

(58) Field of Classification Search
CPC ......... B29C 41/003; B29C 41/14; C08K 3/00; C08K 3/24; C08K 5/053; C08K 3/10; C08L 13/02; C08L 2312/00; A41D 19/04; A41D 19/0062; B29K 2009/00; B29K 2105/0064; B29K 2105/24; B29L 2031/4864
See application file for complete search history.

(56) References Cited

U.S. PATENT DOCUMENTS

| | | | |
|---|---|---|---|
| 6,329,444 B1 * | 12/2001 | McGlothlin | B29C 41/003 2/161.7 |
| 2002/0101007 A1 | 8/2002 | Koide et al. | |
| 2003/0017286 A1 | 1/2003 | Williams et al. | |
| 2004/0010067 A1 * | 1/2004 | Ota | B29C 41/14 524/432 |
| 2005/0038174 A1 | 2/2005 | Suzuki | |
| 2006/0059604 A1 * | 3/2006 | Lai | B29C 41/14 2/168 |
| 2007/0082152 A1 * | 4/2007 | Kodama | C08J 5/02 428/35.7 |
| 2007/0105971 A1 * | 5/2007 | Schaller | C08J 5/02 521/84.1 |
| 2008/0227913 A1 | 9/2008 | Koide | |
| 2008/0319119 A1 | 12/2008 | Waddell et al. | |
| 2009/0292081 A1 | 11/2009 | Suddaby | |
| 2010/0168302 A1 * | 7/2010 | Nagamori | C08K 5/18 524/186 |

(Continued)

FOREIGN PATENT DOCUMENTS

| | | |
|---|---|---|
| CN | 101456922 A | 6/2009 |
| JP | H07-316211 A | 12/1995 |

(Continued)

OTHER PUBLICATIONS

Jul. 25, 2019 Office Action issued in U.S. Appl. No. 16/078,554.

(Continued)

*Primary Examiner* — Nahida Sultana
(74) *Attorney, Agent, or Firm* — Oliff PLC

(57) ABSTRACT

A method for producing a glove, including a step of forming a dip-molded layer by dip-molding a latex composition containing a latex of a carboxyl group-containing conjugated diene rubber (A) and a metal compound (B) including a divalent or higher metal, and is substantially free from sulfur and/or a sulfur-containing compound as a cross-linking agent, and a step of irradiating the dip-molded layer with radiation.

11 Claims, No Drawings

(56) References Cited

U.S. PATENT DOCUMENTS

| | | |
|---|---|---|
| 2012/0172509 A1 | 7/2012 | Nagamori et al. |
| 2012/0246799 A1 | 10/2012 | Khoo et al. |
| 2013/0102725 A1 | 4/2013 | Nagamori et al. |
| 2014/0296404 A1 | 10/2014 | Nagamori et al. |
| 2015/0232637 A1 | 8/2015 | Cha et al. |
| 2017/0088700 A1 | 3/2017 | Nakashima et al. |
| 2017/0137584 A1 | 5/2017 | Tung et al. |
| 2019/0010271 A1 | 1/2019 | Kodemura et al. |
| 2019/0040238 A1 | 2/2019 | Lee et al. |
| 2019/0045863 A1* | 2/2019 | Kitagawa ............... C08K 5/053 |
| 2019/0091898 A1 | 3/2019 | Yamamoto et al. |
| 2019/0119474 A1 | 4/2019 | Tung et al. |
| 2019/0177517 A1 | 6/2019 | Igari et al. |
| 2020/0157314 A1* | 5/2020 | Yamamoto ........... C08K 5/1345 |

FOREIGN PATENT DOCUMENTS

| | | |
|---|---|---|
| JP | 2003-165814 A | 6/2003 |
| JP | 2005-060577 A | 3/2005 |
| JP | 2008-297594 A | 12/2008 |
| JP | 2009-520049 A | 5/2009 |
| JP | 2009-138194 A | 6/2009 |
| JP | 2012-188797 A | 10/2012 |
| JP | 2015-105281 A | 6/2015 |
| WO | 00/73367 A1 | 12/2000 |
| WO | 2007/072900 A1 | 6/2007 |
| WO | 2015/147010 A1 | 10/2015 |
| WO | 2016/072835 A1 | 5/2016 |
| WO | 2017/116227 A1 | 7/2017 |
| WO | 2017/130889 A1 | 8/2017 |
| WO | 2017/146238 A1 | 8/2017 |

OTHER PUBLICATIONS

May 30, 2017 International Search Report issued in International Patent Application No. PCT/JP2017/007226.
Jan. 23, 2020 Office Action issued in U.S. Appl. No. 16/078,554.
Apr. 25, 2017 International Search Report issued in International Application No. PCT/JP2017/007225.
Sep. 18, 2019 Extended Search Report issued in European Application No. 17756672.6.
Sep. 18, 2019 Extended Search Report issued in European Application No. 17756673.4.
Sep. 18, 2019 Extended Search Report issued in European Application No. 17756674.2.
Lakatos et al., "Complexes of Al(III) with D-gluconic acid," Science Direct, Polyhedron, No. 27, pp. 118-124, 2008.
Pallagi et al., "Complexation of Al(III) with gluconate in alkaline to hyperalkaline solutions: formation, stabiity and structure," Dalton Transactions, No. 42, pp. 13470-13476, 2013.
Motekaitis et al., "Complexes of Aluminum (III) with Hydroxy Carboxylic Acids," Inorg. Chem., No. 23, pp. 18-23, 1984.
Jun. 19, 2020 Office Action issued in U.S. Appl. No. 16/079,225.
May 12, 2020 Office Action issued in U.S. Appl. No. 16/078,554.

* cited by examiner

METHOD FOR MANUFACTURING GLOVE

TECHNICAL FIELD

The present invention relates to a method for producing a glove, and more particularly to a method for producing a glove having high tensile strength, large elongation, a supple texture, and high stress retention.

BACKGROUND ART

Conventionally, a dip-molded article, such as a nipple, a balloon, a glove, a balloon, a sack or the like produced by dip-molding a latex composition containing natural latex represented by natural rubber latex and used in contact with a human is known. However, since natural latex contains a protein that causes allergic symptoms in the human body, there have been problems with dip-molded articles, in particular gloves, that come into direct contact with a living mucous membrane or an organ in many cases. Therefore, the use of synthetic nitrile rubber latex has been studied.

For example, Patent Document 1 discloses a latex obtained by copolymerizing 100 parts by weight of a monomer mixture comprising 65 to 84.5 parts by weight of a conjugated diene monomer, 15 to 25 parts by weight of an ethylenically unsaturated nitrile monomer, and 0.5 to 10 parts by weight of an ethylenically unsaturated acid monomer, and 0 to 19.5 parts by weight of another ethylenically unsaturated monomer copolymerizable therewith, and a dip-molded article obtained by dip-molding a latex composition obtained by blending sulfur with such a latex. According to the dip-molded article described in Patent Document 1, the texture is excellent and sufficient tensile strength can be obtained, but stress retention is not necessarily sufficient. In particular, regarding such a dip-molded article, in the case of a glove, the glove also needs to have excellent stress retention in addition to having excellent texture and sufficient tensile strength, from the perspective of making the glove less susceptible to slackness (looseness or bagginess) when used.

RELATED ART

Patent Documents

Patent Document 1: Japanese Unexamined Patent Publication No. 2003-165814

SUMMARY OF THE INVENTION

Problem to be Solved by the Invention

It is an object of the present invention to provide a method for producing a glove having high tensile strength, large elongation, a supple texture, and high stress retention.

Means for Solving the Problem

As a result of extensive studies to solve the above-mentioned problems, the present inventors found that by using latex composition that contains a latex of a carboxyl group-containing conjugated diene rubber and a cross-linking agent, but that is substantially free from sulfur, and irradiating with radiation, such as γ-rays, on a dip-molded layer obtained by dip-molding such a latex composition, a glove can be produced that has high tensile strength, large elongation, a soft texture, and high stress retention, thereby completing the present invention.

Specifically, according to the present invention, there is provided a method for producing a glove, including:

a step of forming a dip-molded layer by dip-molding a latex composition containing a latex of a carboxyl group-containing conjugated diene rubber (A) and a metal compound (B) including a divalent or higher metal, and is substantially free from sulfur and/or a sulfur-containing compound as a cross-linking agent; and a step of irradiating the dip-molded layer with radiation.

In the production method of the present invention, the carboxyl group-containing conjugated diene rubber (A) is preferably at least one selected from a carboxyl group-containing nitrile rubber (a1), a carboxyl group-containing styrene-butadiene rubber (a2), and a carboxyl group-containing butadiene rubber (a3).

In the production method of the present invention, the metal compound (B) including a divalent or higher metal preferably includes a metal compound including a trivalent or higher metal.

In the production method of the present invention, it is preferable to use a metal compound including a trivalent or higher metal and a metal compound including a divalent metal in combination as the metal compound (B) including a divalent or higher metal.

In the production method of the present invention, the metal compound including a trivalent or higher metal is preferably an aluminum compound.

In the production method of the present invention, the latex composition preferably further contains at least one alcoholic hydroxyl group-containing compound (C) selected from a saccharide (c1), a sugar alcohol (c2), a hydroxy acid (c3), and a hydroxy acid salt (c4).

In the production method of the present invention, the metal compound (B) including a divalent or higher metal preferably has a content in the latex composition of 0.1 to 5 parts by weight, based on 100 parts by weight of the carboxyl group-containing conjugated diene rubber (A) included in the latex.

In the production method of the present invention, the radiation used for irradiation in the step of irradiating with radiation is preferably γ-rays.

Effects of Invention

According to the present invention, there can be provided a method for producing a glove having high tensile strength, large elongation, a supple texture, and high stress retention.

DESCRIPTION OF EMBODIMENTS

A method for producing a glove according to the present invention comprises:

a step of forming a dip-molded layer by dip-molding a latex composition containing a latex of a carboxyl group-containing conjugated diene rubber and a metal compound (B) including a divalent or higher metal, and is substantially free from sulfur and/or a sulfur-containing compound as a cross-linking agent; and a step of irradiating the dip-molded layer with radiation.

Latex Composition

First, the latex composition used in the production method of the present invention is described.

The latex composition used in the present invention contains a latex of a carboxyl group-containing conjugated diene rubber (A) and a metal compound (B) including a divalent or higher metal, and is substantially free from sulfur and/or a sulfur-containing compound as a cross-linking agent.

The latex of the carboxyl group-containing conjugated diene rubber (A) may be a latex of a copolymer obtained by copolymerizing a conjugated diene monomer and an ethylenically unsaturated carboxylic acid monomer. However, preferred is a latex of at least one rubber selected from a carboxyl group-containing nitrile rubber (a1), a carboxyl group-containing styrene-butadiene number (a2), and a carboxyl group-containing butadiene rubber (a3).

The latex of the carboxyl group-containing nitrile rubber (a1) is a latex of a copolymer obtained by copolymerizing an ethylenically unsaturated nitrile monomer in addition to a conjugated diene monomer and an ethylenically unsaturated carboxylic acid monomer. In addition to these, this latex may be a latex of a copolymer obtained by copolymerizing with another ethylenically unsaturated monomer optionally used and copolymerizable therewith.

Examples of the conjugated diene monomer include 1,3-butadiene, isoprene, 2,3-dimethyl-1,3-butadiene, 2-ethyl-1,3-butadiene, 1,3-pentadiene, chloroprene, and the like. Of these, 1,3-butadiene is preferable, and 1,3-butadiene is more preferable. These conjugated diene monomers can be used singly or in combinations. The content of the conjugated diene monomer unit formed by the conjugated diene monomer in the carboxyl group-containing nitrile rubber (a1) is preferably 56 to 78% by weight, more preferably 56 to 73% by weight, and even more preferably 56 to 70% by weight. By setting the content of the conjugated diene monomer unit within the above range, the glove obtained by the production method of the present invention has a better texture and longer elongation while also having sufficient tensile strength.

Further, among monomer units derived from conjugated diene monomers, monomer units derived from isoprene may cause softening and degradation upon irradiation with radiation (described later). Therefore, the content of monomer units derived from isoprene in the carboxyl group-containing nitrile rubber (a1) is preferably 5% by weight or less, more preferably 2.5% by weight or less, even more preferably 1% by weight or less, and particularly preferably is substantially free from monomer units derived from isoprene. For the same reason, the latex of the carboxyl group-containing styrene-butadiene rubber (a2) described later, the latex of the carboxyl group-containing butadiene rubber (a3) described later, and the other latex of the carboxyl group-containing conjugated diene rubber (A) also preferably have a content of isoprene-derived monomer units in their carboxyl group-containing conjugated diene rubbers of 5% by weight or less, more preferably 2.5% by weight or less, even more preferably 1% by weight or less, and particularly preferably is substantially free from monomer units derived from isoprene.

The ethylenically unsaturated carboxylic acid monomer is not particularly limited as long as it is an ethylenically unsaturated monomer containing a carboxyl group. Examples thereof may include ethylenically unsaturated monocarboxylic acid monomers such as acrylic acid and methacrylic acid; ethylenically unsaturated polyvalent carboxylic acid monomers such as itaconic acid, maleic acid, and fumaric acid; ethylenically unsaturated polyvalent carboxylic acid anhydrides such as maleic anhydride and citraconic anhydride; and ethylenically unsaturated polycarboxylic acid partial ester monomers such as monobutyl fumarate, monobutyl malate, and mono-2-hydroxypropyl maleate. Of these, ethylenically unsaturated monocarboxylic acids are preferable, and methacrylic acid is particularly preferable. These ethylenically unsaturated carboxylic acid monomers can also be used in the form of an alkali metal salt or an ammonium salt. Further, the ethylenically unsaturated carboxylic acid monomer can be used singly or in combinations. The content of the ethylenically unsaturated carboxylic acid monomer unit formed by the ethylenically unsaturated carboxylic acid monomer in the carboxyl group-containing nitrile rubber (a1) is preferably 2 to 6.5% by weight, more preferably 2 to 6% by weight, even more preferably 2 to 5% by weight, still more preferably 2 to 4.5% by weight, and particularly preferably 2.5 to 4.5% by weight. By setting the content of the ethylenically unsaturated carboxylic acid monomer unit within the above range, the glove obtained by the production method of the present invention has a better texture and longer elongation while also having sufficient tensile strength.

The ethylenically unsaturated nitrile monomer is not particularly limited as long as it is an ethylenically unsaturated monomer containing a nitrile group. Examples thereof may include acrylonitrile, methacrylonitrile, fumaronitrile, α-chloroacrylonitrile, α-cyanoethyl acrylonitrile, and the like. Of those, acrylonitrile and methacrylonitrile are preferable, and acrylonitrile is more preferable. These ethylenically unsaturated nitrile monomers can be used singly or in combinations. The content of the ethylenically unsaturated nitrile monomer unit formed by the ethylenically unsaturated nitrile monomer in the carboxyl group-containing nitrile rubber (a1) is preferably 20 to 40% by weight, more preferably 25 to 40% by weight, and even, more preferably 30 to 40% by weight. By setting the content of the ethylenically unsaturated nitrile monomer unit within the above range, the glove obtained by the production method of the present invention has a better texture and longer elongation while also having sufficient tensile strength.

Examples of other ethylenically unsaturated monomers that are copolymerizable with the conjugated diene monomer, the ethylenically unsaturated carboxylic acid monomer, and the ethylenically unsaturated nitrile monomer include vinyl aromatic monomers such as styrene, alkylstyrene, and vinylnaphthalene; fluoroalkyl vinyl ethers such as fluoroethyl vinyl ether; ethylenically unsaturated amide monomers such as (meth)acrylamide, N-methylol (meth)acrylamide, N,N-dimethylol (meth)acrylamide, N-methoxymethyl (meth)acrylamide, and N-propoxymethyl (meth)acrylamide; ethylenically unsaturated carboxylic acid ester monomers such as methyl (meth)acrylate, ethyl (meth)acrylate, butyl (meth)acrylate, 2-ethylhexyl (meth)acrylate, trifluoroethyl (meth)acrylate, tetrafluoropropyl dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth)acrylate, 2-cyanoethyl (meth)acrylate, 1-cyanopropyl (meth)acrylate, 2-ethyl-6-cyanohexyl (meth)acrylate, 3-cyanopropyl (meth)acrylate, hydroxyethyl (meth)acrylate, hydroxypropyl (meth)acrylate, glycidyl (meth)acrylate, and dimethylaminoethyl (meth)acrylate; cross-linkable monomers such as divinylbenzene, polyethylene glycol di(meth)acrylate, polypropylene glycol di(meth)acrylate, trimethylolpropane tri(meth)acrylate, and pentaerythritol (meth)acrylate. These ethylenically unsaturated monomers can be used singly or in combinations.

The content of the other monomer unit formed by the other ethylenically unsaturated monomer in the carboxyl group-containing nitrile rubber (a1) is preferably 10% by weight or less, more preferably 5% by weight or less, and even more preferably 3% by weight or less.

The latex of the carboxyl group-containing nitrile rubber (a1) can be obtained by copolymerizing a monomer mixture containing the above-mentioned monomers, and a method of copolymerizing by emulsion polymerization is preferred. A conventionally known method can be employed as the emulsion polymerization method.

During the emulsion polymerization of the monomer mixture containing the above-mentioned monomers, generally-used polymerization auxiliary materials, such as an emulsifier, a polymerization initiator, a molecular weight regulator can be used. The method for adding these polymerization auxiliary materials is not particularly limited, and any method may be used, such as an initially adding in one batch, adding in several stages, or continuously adding the polymerization auxiliary materials.

Examples of the emulsifier include, but are not particularly limited to, nonionic emulsifiers such as polyoxyethylene alkyl ether, polyoxyethylene alkylphenol ether, polyoxyethylene alkyl ester, and polyoxyethylene sorbitan alkyl ester; anionic emulsifiers such as alkylbenzenesulfonic acid salts like potassium dodecylbenzenesulfonate and sodium dodecylbenzene sulfonate, higher alcohol sulfuric acid ester salts, and alkylsulfosuccinic acid salts; cationic emulsifiers such as alkyltrimethylammonium chloride, dialkylammonium chloride, and benzylammonium chloride; and copolymerizable emulsifying agents such as a sulfoester of an α,β-unsaturated carboxylic acid, a sulfate ester of an α,β-unsaturated carboxylic acid, and sulfoalkylaryl ether. Among these, anionic emulsifiers are preferable, alkylbenzenesulfonate is more preferable, and potassium dodecylbenzenesulfonate and sodium dodecylbenzenesulfonate are particularly preferable. These emulsifiers can be used singly or in combinations. The amount of emulsifier to be used is preferably 0.1 to 10 parts by weight based on 100 parts by weight of the monomer mixture.

Examples of the polymerization initiator include, but are not particularly limited to, inorganic peroxides such as sodium persulfate, potassium persulfate, ammonium persulfate, potassium perphosphate, and hydrogen peroxide; organic peroxides such as diisopropylbenzene hydroperoxide, cumene hydroperoxide, t-butyl hydroperoxide, 1,1,3,3-tetramethylbutyl hydroperoxide, 2,5-dimethylhexane-2,5-dihydroperoxide, di-t-butyl peroxide, di-α-cumyl peroxide, acetyl peroxide, isobutyryl peroxide, and benzoyl peroxide; and azo compounds such as azobisisobutyronitrile, azobis-2,4-dimethylvaleronitrile, and methyl azobisisobutyrate. Each of these polymerization initiators can be used singly or in combinations. The amount of the polymerization initiator to be used is preferably 0.01 to 10 parts by weight, and more preferably 0.01 to 2 parts by weight, based on 100 parts by weight of the monomer mixture.

In addition, a peroxide initiator can be used as a redox type polymerization initiator in combination with a reducing agent. Examples of the reducing agent include, but are not particularly limited to, a compound containing a metal ion in a reduced state such as ferrous sulfate or cuprous naphthenate; a sulfonic acid compound such as sodium methanesulfonate; and an amine compound such as dimethylaniline. These reducing agents can be used singly or in combinations. The amount of the reducing agent to be used is preferably 3 to 1000 parts by weight based on 100 parts by weight of the peroxide.

The amount of ester used during emulsion polymerization is preferably 80 to 600 parts by weight, and particularly preferably 100 to 200 parts by weight, based on 100 parts by weight of the total monomers used.

As the method for adding the monomers, any of a method in which the monomers to be used are added to the reaction vessel in one go, a method in which the monomer is continuously or intermittently added as polymerization proceeds, a method in which a part of the monomers are added and reacted until a specific conversion ratio is reached, and then the remaining monomers are continuously or intermittently added and polymerized, and the like may be employed. In the case of mixing the monomers and adding continuously or intermittently, the composition of the mixture may be constant or may be changed. In addition, each monomer may be added to the reaction vessel after mixing the various monomers to be used in advance, or may be separately added to the reaction vessel.

Further, polymerization auxiliary materials, such as a chelating agent, a dispersing agent, a pH adjusting agent, a deoxidizing agent, and a particle size adjusting agent, can be optionally used. The type and amount to be used of such polymerization auxiliary materials are not particularly limited.

The polymerization temperature in carrying out the emulsion polymerization is not particularly limited, but it is usually 3 to 95° C., and preferably 5 to 60° C. The polymerization time is about 5 to 40 hours.

As described above, the monomer mixture is subjected to emulsion polymerization, and when a predetermined polymerization conversion ratio is reached, the polymerization reaction is terminated by cooling the polymerization system or adding a polymerization terminator. The polymerization conversion ratio when the polymerization reaction is terminated is preferably 90% by weight or more, and more preferably 93% by weight or more.

Examples of the polymerization terminator include, but are not particularly limited to, hydroxylamine, hydroxylamine sulfate, diethylhydroxylamine, hydroxyamine sulfonic acid and alkali metal salts thereof, sodium dimethyldithiocarbamate, hydroquinone derivatives, catechol derivatives, and aromatic hydroxydithiocarboxylic acids, such as hydroxydimethylbenzenethiocarboxylic acid, hydroxydiethylbenzenedithiocarboxylic acid, and hydroxydibutylbenzenedithiocarboxylic acid, and alkali metal salts thereof. The amount of the polymerization terminator to be used is preferably 0.05 to 2 parts by weight based on 100 parts by weight of the monomer mixture.

After the polymerization reaction has been terminated, the latex of the carboxyl group-containing nitrile rubber (a1) can be obtained by removing unreacted monomers to adjust the solid content concentration and the pH, if desired.

Further, an anti-aging agent, a preservative, an antibacterial agent, a dispersing agent, and the like may optionally be appropriately added to the latex of the carboxyl group-containing nitrile rubber (a1).

The number average particle diameter of the latex of the carboxyl group-containing nitrile rubber (a1) is preferably 60 to 300 nm, and more preferably 80 to 150 nm. The particle size can be adjusted to a desired value by a method such as adjusting the amount of the emulsifier and the polymerization initiator to be used.

The latex of the carboxyl group-containing styrene-butadiene rubber (a2) is a latex of a copolymer obtained by copolymerizing styrene in addition to 1,3-butadiene as the conjugated diene monomer and an ethylenically unsaturated carboxylic acid monomer. In addition to these, this latex may be a latex of a copolymer obtained by copolymerizing with another ethylenically unsaturated monomer optionally used and copolymerizable therewith.

The content of the butadiene unit formed by 1,3-butadiene in the carboxyl group-containing styrene-butadiene rubber (a2) is preferably 56 to 78% by weight, more preferably 56 to 73% by weight, and even more preferably 56 to 68% by weight. By setting the content of the butadiene unit within the above range, the glove obtained by the production method of the present invention has a better texture and longer elongation while also having sufficient tensile strength.

The ethylenically unsaturated carboxylic acid monomer is not particularly limited as long as it is an ethylenically unsaturated monomer containing a carboxyl group. Examples of ethylenically unsaturated carboxylic acid monomers that can be used include the same examples as mentioned above for the latex of the carboxyl group-containing nitrile rubber (a1). The content of the ethylenically unsaturated carboxylic acid monomer unit formed by the ethylenically unsaturated carboxylic acid monomer in the carboxyl group-containing styrene-butadiene rubber (a2) is preferably 2 to 6.5% by weight, more preferably 2 to 6% by weight, even more preferably 2 to 5% by weight, still more preferably 2 to 4.5% by weight, and particularly preferably 2.5 to 4.5% by weight. By setting the content of the ethylenically unsaturated carboxylic acid monomer unit within the above range, the glove obtained by the production method of the present invention has a better texture and longer elongation while also having sufficient tensile strength.

The content of the styrene unit formed by styrene in the carboxyl group-containing styrene-butadiene rubber (a2) is preferably 20 to 40% by weight, more preferably 25 to 40% by weight, and even more preferably 30 to 40% by weight. By setting the content of the styrene unit within the above range, the glove obtained by the production method of the present invention has a better texture and longer elongation while also having sufficient tensile strength.

Examples of other ethylenically unsaturated monomers copolymerizable with 1,3-butadiene as the conjugated diene monomer, the ethylenically unsaturated carboxylic acid monomer, and styrene include, in addition to the ethylenically unsaturated monomers (except styrene) mentioned above for the latex of the carboxyl group-containing nitrile rubber (a1), conjugated diene monomers other than 1,3-butadiene of isoprene, 2,3-dimethyl-1,3-butadiene, 2-ethyl-1,3-butadiene, 1,3-pentadiene, and chloroprene. The content of the other monomer unit formed by the other ethylenically unsaturated monomer in the carboxyl group-containing styrene-butadiene rubber (a2) is preferably 10% by weight or less, more preferably 5% by weight or less, and even more preferably 3% by weight or less.

The latex of the carboxyl group-containing styrene-butadiene rubber (a2) used in the present invention can be obtained by copolymerizing a monomer mixture containing the above-mentioned monomers, but a method of copolymerizing by emulsion polymerization is preferable. The emulsion polymerization method may be carried out in the same manner and by employing the same polymerization auxiliary materials as for the carboxyl group-containing nitrile rubber (a1).

Further, an anti-aging agent, a preservative, an antibacterial agent, a dispersing agent, and the like may optionally be appropriately added to the latex of the carboxyl group-containing styrene-butadiene rubber (a2) used in the present invention.

The number average particle diameter of the latex of the carboxyl group-containing styrene-butadiene rubber (a2) used in the present invention is preferably 60 to 300 nm, and more preferably 80 to 150 nm. The particle size can be adjusted to a desired value by a method such as adjusting the amount of the emulsifier and the polymerization initiator to be used.

The latex of the carboxyl group-containing conjugated diene rubber (a3) is a latex of a copolymer obtained by copolymerizing a conjugated diene monomer and an ethylenically unsaturated carboxylic acid monomer. In addition to these, this latex may be a latex of a copolymer obtained by copolymerizing with another ethylenically unsaturated monomer optionally used and copolymerizable therewith.

The content of the conjugated diene monomer unit formed by the conjugated diene monomer in the carboxyl group-containing conjugated diene rubber (a3) is preferably 80 to 98% by weight, more preferably 90 to 98% by weight, and even more preferably 95 to 97.5% by weight. By setting the content of the conjugated diene monomer unit within the above range, the glove obtained by the production method of the present invention has a better texture and longer elongation while also having sufficient tensile strength.

The ethylenically unsaturated carboxylic acid monomer is not particularly limited as long as it is an ethylenically unsaturated monomer containing a carboxyl group. Examples of ethylenically unsaturated carboxylic acid monomers that can be used include the same examples as mentioned above for the latex of the carboxyl group-containing nitrile rubber (a1). The content of the ethylenically unsaturated carboxylic acid monomer unit formed by the ethylenically unsaturated carboxylic acid monomer in the carboxyl group-containing conjugated diene rubber (a3) is preferably 2 to 10% by weight, more preferably 2 to 7.5% by weight, even more preferably 2 to 6.5% by weight, still more preferably 2 to 6% by weight, particularly preferably 2 to 5% by weight, and most preferably 2.5 to 5% by weight. By setting the content of the ethylenically unsaturated carboxylic acid monomer unit within the above range, the glove obtained by the production method of the present invention has a better texture and longer elongation while also having sufficient tensile strength.

Examples of the conjugated diene monomer include 1,3-butadiene, isoprene, 2,3-dimethyl-1,3-butadiene, 2-ethyl-1,3-butadiene, 1,3-pentadiene, chloroprene, and the like. As the conjugated diene monomer, any one of these may be used alone, or two or more of them can be used in combination.

Examples of other ethylenically unsaturated monomers copolymerizable with the conjugated diene monomer and the ethylenically unsaturated carboxylic acid monomer include the ethylenically unsaturated monomers (except styrene) mentioned above for the latex of the carboxyl group-containing nitrile rubber (a1). The content of the other monomer unit formed by the other ethylenically unsaturated monomer in the carboxyl group-containing conjugated diene rubber (a3) is preferably 10% by weight or less, more preferably 5% by weight or less, and even more preferably 3% by weight or less.

The latex of the carboxyl group-containing conjugated diene rubber (a3) used in the present invention can be obtained by copolymerizing a monomer mixture containing the above-mentioned monomers, but a method of copolymerizing by emulsion polymerization is preferred. The emulsion polymerization method may be carried out in the same manner and by employing the same polymerization auxiliary materials as for the carboxyl group-containing nitrile rubber (a1).

The latex composition of the present invention contains, in addition to the latex of the above-mentioned carboxyl group-containing conjugated diene rubber (A), a metal compound (B) including a divalent or higher metal.

The metal compound (B) including a divalent or higher metal can form a cross-linked structure through metal ion bonding by reacting with the carboxyl group included in the above-mentioned carboxyl group-containing conjugated diene rubber (A), thereby acting as a cross-linking agent.

Examples of the metal compound (B) including a divalent or higher metal include, but are not particularly limited to, zinc compounds, magnesium compounds, titanium compounds, calcium compounds, lead compounds, iron compounds, tin compounds, chromium compounds, cobalt compounds, zirconium compounds, aluminum compounds, and the like. These metal compounds (B) including a divalent or higher metal can be used singly or in combinations. Among them, from the perspective that the glove obtained by the production method of the present invention can have better stress retention, a metal compound including a trivalent or higher metal is preferable, and an aluminum compound is particularly preferable.

Examples of the aluminum compound include aluminum oxide, aluminum chloride, aluminum hydroxide, aluminum nitrate, aluminum sulfate, aluminum metal, aluminum ammonium sulfate, aluminum bromide, aluminum fluoride, aluminum potassium sulfate, aluminum isopropoxide, sodium aluminate, potassium aluminate, sodium aluminum sulfite, and the like. Of these, sodium aluminate is preferable. These aluminum compounds can be used singly or in combinations.

When a metal compound including a trivalent or higher metal is used as the metal compound (B) including a divalent or higher metal, a metal compound including a divalent metal may be used in combination therewith. Using a metal compound including a divalent metal in combination therewith enables the tensile strength of the glove obtained by the production method of the present invention to be further increased. As the metal compound including a divalent metal in the case of using a metal compound including a trivalent or higher metal and a metal compound including a divalent metal in combination, a zinc compound, a magnesium compound, a calcium compound, and a lead compound are preferable, a zinc compound is more preferable, and zinc oxide is particularly preferable.

The content of the metal compound (B) including a divalent or higher metal in the latex composition used in the present invention is, based on 100 parts by weight of the carboxyl group-containing conjugated diene rubber (A) included in the latex, preferably 0.1 to 5 parts by weight, more preferably 0.5 to 2.5 parts by weight, and even more preferably 0.5 to 2.0 parts by weight. By setting the content of the metal compound (B) including a divalent or higher metal to the above range, when performing cross-linking, the cross-linking can be sufficient while also achieving good stability as a latex composition. In addition, in the case of using a metal compound including a trivalent or higher metal as the metal compound (B) including a divalent or higher metal, the content of the metal compound including a trivalent or higher metal in the latex composition is, from the perspective of the stability and cross-linkability of the latex composition, preferably in the range of 0.1 to 1.5 parts by weight based on 100 parts by weight of the carboxyl group-containing conjugated diene rubber (A) included in the latex, more preferably 0.1 to 1.25 parts by weight, and even more preferably 0.1 to 1.0 part by weight. In addition, when a metal compound including a trivalent or higher metal and a metal compound containing a divalent metal are used in combination as the metal compound (B) including a divalent or higher metal, from the perspective of stability and cross-linkability of the latex composition, the content ratio of the "metal compound including a trivalent or higher metal:metal compound including a divalent metal" is preferably, in terms of weight ratio, in the range of 100:0 to 0:100, and more preferably in the range of 10:90 to 90:10.

Further, in the present invention, as the latex composition, a latex composition that is substantially free from sulfur and/or a sulfur-containing compound as a cross-linking agent is used. By using a latex composition that is substantially free from sulfur and/or a sulfur-containing compound as a cross-linking agent, the glove obtained by the production method of the present invention can be made to have excellent stress retention.

In particular, according to the production method of the present invention, a glove obtained by dip-molding a latex composition to form a dip-molded layer, and then irradiating the obtained dip-molded layer with radiation enables stress retention to be improved while having high tensile strength, long elongation, and a supple texture. On the other hand, according to the knowledge gained by the inventors of the present invention, if sulfur and/or a sulfur-containing compound as a cross-linking agent is contained, those effects cannot be obtained. Although the reasons for this are not entirely clear, it is thought that irradiating with radiation enables the carbon-carbon double bond moiety of the conjugated diene monomer unit of the carboxyl group-containing conjugated diene rubber (A) included in the latex composition to be cross-linked, which results in a large improvement in tensile strength as well as a high stress retention to be realized. On the other hand, sulfur and/or a sulfur-containing compound as a cross-linking agent reacts with the carbon-carbon double bond moiety of the carboxyl group-containing conjugated diene rubber (A), which prevents the above-mentioned effects from being obtained.

Examples of sulfur as a cross-linking agent include elemental sulfur that is substantially composed only of sulfur atoms and is applied as a cross-linking agent for cross-linking various rubbers, and in particular, elemental sulfur that acts on the carbon-carbon double bond moiety of the conjugated diene monomer unit. Specific examples thereof include powdered sulfur, precipitated sulfur, colloidal sulfur, insoluble sulfur, highly dispersible sulfur, and the like. Examples of a sulfur-containing compound as a cross-linking agent include a compound that contains a sulfur atom and that is applied as a cross-linking agent for cross-linking various rubbers, and in particular, a compound that acts on the carbon-carbon double bond moiety of the conjugated diene monomer unit. Specific examples thereof include sulfur monochloride, sulfur dichloride, 4,4'-dithiodimorpholine, alkylphenol disulfide, 6-methylquinoxaline-2,3-dithiocarbonate, caprolactam disulfide, dibutyl zinc dithiocarbamate, phosphorus-containing polysulfide, polymer polysulfide, and the like.

The latex composition used in the present invention does not contain such sulfur and/or sulfur-containing compound as a cross-linking agent. However, the latex composition is acceptable if it can be determined that the composition is substantially free from sulfur and/or a sulfur-containing compound as a cross-linking agent, and hence the latex composition may contain sulfur and/or a sulfur-containing compound at a level considered to be impurities (e.g., less than 0.1 parts by weight based on 100 parts by weight of the carboxyl group-containing conjugated diene rubber (A)).

When a metal compound including a trivalent or higher metal is used as the metal compound (B) including a divalent or higher metal in the latex composition used in the present invention, the latex composition preferably further contains at least one kind of alcoholic hydroxyl group-containing compound (C) selected from a saccharide (c1), a sugar alcohol (c2), a hydroxy acid (c3), and a hydroxy acid salt (c4). By further including such an alcoholic hydroxyl group-containing compound (C), the dispersibility of the metal compound including a trivalent or higher metal in the latex composition can be further increased, and as a result, the latex composition can have good stability. As a result, the stress retention of the glove obtained by the production method of the present invention can be increased more appropriately.

The alcoholic hydroxyl group-containing compound (C) used in the present invention is at least one kind selected from the saccharide (c1), the sugar alcohol (c2), the hydroxy acid (c3), and the hydroxy acid salt (c4). Of those, from the perspective of further increasing the action and effect of the present invention, it is preferable to use at least one selected from the sugar alcohol (c2) and the hydroxy acid salt (c4). When two or more kinds of alcoholic hydroxyl group-containing compounds (C) are used in combination, it is preferable to use a combination of at least one selected from the saccharide (c1) and the sugar alcohol (c2) and at least one selected from the hydroxy acid (c3) and the hydroxy acid salt (c4), and more preferable to use a combination of the sugar alcohol (c2) and the hydroxy acid salt (c4).

The saccharide (c1) is not particularly limited as long as it is a monosaccharide or a polysaccharide in which two or more monosaccharides are bound by a glycosidic bond. Examples thereof may include monosaccharides such as erythrose, threose, ribose, lyxose, xylose, arabinose, allose, talose, gulose, altrose, galactose, idose, erythrulose, xylulose, ribulose, psicose, fructose, sorbose, and tagatose; disaccharides such as trehalose, maltose, isomaltose, cellobiose, gentiobiose, melibiose, lactose, sucrose, and palatinose; trisaccharides such as maltotriose, isomaltotriose, panose, cellotriose, manninotriose, solatriose, melezitose, planteose, gentianose, umbelliferose, lactosucrose, and raffinose; homo-oligosaccharides such as maltotetraose and isomaltotetraose; tetrasaccharides such as stachyose, cellotetraose, scorodose, lyquinose, and panose; pentasaccharides such as maltopentaose and isomaltopentaose; hexasaccharides such as maltohexaose and isomaltotetraose; and the like. These may be used singly or in combinations.

The sugar alcohol (c2) may be a sugar alcohol of a monosaccharide or a polysaccharide. Examples there include, but are not particularly limited to, tritols such as glycerin; tetritols such as erythritol, D-threitol, L-threitol; pentitols such as D-arabinitol, L-arabinitol, xylitol, ribitol, and pentaerythritol; pentaerythritol; hexitols such as sorbitol, D-iditol, galactitol, D-glucitol, and mannitol; heptitols such as volemitol and perseitol; octitols such as D-erythro-D-galacto-octitol; and the like. These may be used singly or in combinations. Among them, a hexitol, which is a sugar alcohol having 6 carbon atoms, is preferable, and sorbitol is more preferable.

The hydroxy acid (c3) is not particularly limited as long as it is a carboxylic acid having a hydroxyl group. Examples thereof may include aliphatic hydroxy acids such as glycolic acid, lactic acid, tartronic acid, glyceric acid, 2-hydroxybutyric acid, 3-hydroxybutyric acid, γ-hydroxy butyric acid, malic acid, 3-methylmalic acid, tartaric acid, citramalic acid, citric acid, isocitric acid, leucinic acid, mevalonic acid, pantoic acid, ricinoleic acid, ricinelaidic acid, cerebric acid, quinic acid, shikimic acid, and serine; aromatic monohydroxy acids such as salicylic acid, creosote acid (homosalicylic acid, hydroxy(methyl)benzoic acid), vanillic acid, sillic acid, hydroxypropanoic acid, hydroxypentanoic acid, hydroxyhexanoic acid, hydroxyheptanoic acid, hydroxyoctanoic acid, hydroxynonanoic acid, hydroxydecanoic acid, hydroxyundecanoic acid, hydroxydododecanoic acid, hydroxytridecanoic acid, hydroxytetradecanoic acid, hydroxypentadecanoic acid, hydroxyheptadecanoic acid, hydroxyoctadecanoic acid, hydroxynonadecanoic acid, and hydroxyicosanoic acid, monohydroxybenzoic acid derivatives such as ricinoleic acid, dihydroxybenzoic acid derivatives such as pyrocatechuic acid, resorcylic acid, protocatechuic acid, gentisic acid, and orthophosphoric acid, trihydroxybenzoic acid derivatives such as gallic acid, phenylacetic acid derivatives such as mandelic acid, benzilic acid, and atorlactic acid, cinnamic acid/hydrocinnamic acid derivatives such as melilotic acid, phloretic acid, coumaric acid, humic acid, cinnamic acid, ferulic acid, and sinapinic acid; and the like. These may be used singly or in combinations. Among them, an aliphatic hydroxy acid is preferable, an aliphatic α-hydroxy acid is more preferable, glycolic acid, lactic acid, tartronic acid, glyceric acid, malic acid, tartaric acid and citric acid are even more preferable, and glycolic acid is particularly preferable.

The hydroxy acid salt (c4) is not particularly limited as long as it is a salt of a hydroxy acid. Examples thereof may include the metal salts of the hydroxy acids exemplified as the hydroxy acid (c3), for example: salts of alkali metals such as sodium and potassium; and salts of alkali earth metals such as calcium and magnesium. One kind of hydroxy acid salt (c4) may be used alone, or two or more kinds may be used in combination. As the hydroxy acid salt (c4), an alkali metal salt of a hydroxy acid is preferable, and a sodium salt of a hydroxy acid is more preferable. Further, the hydroxy acid constituting the hydroxy acid salt (c4) is preferably an aliphatic hydroxy acid, more preferably an aliphatic α-hydroxy acid, even more preferably glycolic acid, lactic acid, tartronic acid, glyceric acid, malic acid, tartaric acid, or citric acid, and glycolic acid is particularly preferable. In other words, sodium glycolate is particularly preferable as the hydroxy acid salt (c4).

The content of the alcoholic hydroxyl group-containing compound (C) relative to the metal cap and including a trivalent or higher metal in the latex composition used in the present invention is, in terms of the weight ratio of the "metal compound including a trivalent or higher metal: alcoholic hydroxyl group-containing compound (C)", preferably set to an amount in the range of 1:0.1 to 1:50, more preferably in the range of 1:0.2 to 1:45, and even more preferably in the range of 1:0.3 to 1:30. By setting the content of the alcoholic hydroxyl group-containing compound (C) within above range, the stability of the latex composition can be further increased.

The content of the alcoholic hydroxyl group-containing compound (C) may be an amount such that the content of the alcoholic hydroxyl group-containing compound (C) relative to the metal compound including a trivalent or higher metal falls within the above range, but is preferably 0.03 to 15 parts by weight, and more preferably 0.05 to 10 parts by weight, based on 100 parts by weight of the carboxyl group-containing conjugated diene robber (A) included in the latex.

The latex composition used in the present invention can be obtained by, for example, blending the metal compound (B) including a divalent or higher metal and the optionally-used alcoholic hydroxyl group-containing compound (C) with the latex of the carboxyl group-containing conjugated diene rubber (A). The method of blending the metal compound (B) including a divalent or higher metal and the optionally-used alcoholic hydroxyl group-containing compound (C) with the latex of the carboxyl group-containing conjugated diene rubber (A) is not particular limited, but from the perspective that the metal compound (B) including a divalent or higher metal can be well dispersed in the resulting latex composition, is preferably carried out by dissolving the metal compound (B) including a divalent or higher metal and the optionally-used alcoholic hydroxyl group-containing compound (C) in water or an alcohol and then adding as an aqueous solution or an alcohol solution.

The latex composition used in the present invention may optionally include, in addition the latex of the carboxyl group-containing conjugated diene rubber (A), the metal compound (B) including a divalent or higher metal, and the alcoholic hydroxyl group-containing compound (C), a filler, a pH adjusting agent, a thickening agent, an anti-aging agent, a dispersing agent, a pigment, a filler, a softening agent, and the like.

The solid content concentration of the latex composition used in the present invention is preferably 10 to 40% by weight, and more preferably 15 to 35% by weight. Further, the pH of the latex composition used in the present invention is preferably 7.5 to 12.0, more preferably 7.5 to 11.0, even more preferably 7.5 to 9.4, and particularly preferably 7.5 to 9.2.

Production Method of Glove

The method for producing a glove according to the present invention includes a step of forming a dip-molded layer by dip-molding the above-described latex composition, and a step of irradiating the formed dip-molded layer with radiation.

The dip-molding is carried out by immersing a glove-shaped mold (glove mold) in the latex composition, depositing the latex composition on the surface of the glove mold, then removing the glove mold from the latex composition, and then drying the latex composition deposited on the surface of the glove mold. Note that the glove mold may be preheated before being immersed in the latex composition. In addition, a coagulant may optionally be used before immersing the glove mold in the latex composition or after removing the glove mold from the latex composition.

Specific examples of the method for using the coagulant include a method in which the glove mold is immersed in a coagulant solution before immersion in the latex composition to adhere the coagulant to the glove mold (anode coagulation immersion method), a method in which a glove mold on which the latex composition has been deposited is immersed in a coagulant solution (Teague coagulation immersion method), and the like. From the perspective of obtaining a dip-molded layer having less thickness unevenness, the anode coagulation immersion method is preferable.

Examples of the coagulant include metal halides such as barium chloride, calcium chloride, magnesium chloride, zinc chloride, and aluminum chloride; nitrates such as barium nitrate, calcium nitrate, and zinc nitrate; acetates such as barium acetate, calcium acetate, and zinc acetate; sulfates such as calcium sulfate, magnesium sulfate, and aluminum sulfate; and the like. Among these, calcium chloride and calcium nitrate are preferable.

The coagulant is usually used as a solution of water, alcohol, or a mixture thereof. The coagulant concentration is usually 5 to 50% by weight, and preferably 10 to 35% by weight.

Then, the obtained dip-molded layer is heat treated to cross-link the metal compound (B) including a divalent or higher metal. The cross-linking carried out at this time proceeds through metal ion bonding as a result of the metal compound (B) including a divalent or higher metal reacting with the carboxyl group included in the carboxyl group-containing conjugated diene rubber (A). Further, before carrying out the heat treatment, the dip-molded layer may be immersed in water, preferably warm water of 30 to 70° C., for about 1 to 60 minutes to remove water-soluble impurities (e.g., surplus emulsifier, coagulant, etc.). The operation of removing water-soluble impurities may also be performed after the dip-molded layer is heat treated, but from the perspective of removing the water-soluble impurities more efficiently, it is preferable to perform the removal treatment before the heat treatment.

The cross-linking by the metal compound (B) containing a divalent or higher metal of the dip-molded layer is usually carried out heat treating at a temperature of 80 to 150° C., preferably for 10 to 130 minutes. As the heating method, external heating with infrared rays or heated air or internal heating by high frequency can be employed. Of those methods, external heating with heated air is preferable.

Then, the cross-linked dip-molded layer is detached from the glove mold to obtain a pre-irradiation dip molded body. As the detachment method, it is possible to peel off from the glove mold by hand, or peel off using water pressure or pressure from compressed air. After detachment, heat treatment may be further carried out at a temperature of 60 to 120° C. for 10 to 120 minutes.

Next, a glove (dip-molded article after radiation irradiation) is obtained by irradiating the obtained pre-irradiation dip-molded article with radiation. According to the production method of the present invention, a glove obtained by the production method of the present invention obtained by irradiating a dip-molded layer (pre-irradiation dip-molded article) formed from the latex composition described above with radiation exhibits a large improvement in tensile strength while having large elongation and a supple texture. Furthermore, the glove exhibits a high stress retention. In particular, for gloves obtained by dip-molding, such as surgical gloves, in addition to high tensile strength and large elongation, it is important that such gloves confer a feeling of being used when worn and used to perform a task. Specifically, in addition to texture (stress at 500% elongation), it is desirable that the glove can effectively prevent the occurrence of looseness and bagginess that occurs over time since being worn (i.e., has a high stress retention represented as a percentage of a stress $M_{100}(6)$ after the elapse of 6 minutes since elongation was stopped with respect to a tensile stress $M_{100}(0)$ when the glove is stretched at 100%). With regard to this, according to the present invention, the glove obtained by the production method of the present invention can have high tensile strength, large elongation, and excellent stress (texture) at 500% elongation, as well as high stress retention.

In the production method of the present invention, the reason why high stress retention can be realized is not entirely clear, but it is thought that irradiating with radiation enables the carbon-carbon double bond moiety of the conjugated diene monomer unit of the carboxyl group-containing conjugated diene rubber (A) included in the latex composition to be cross-linked, which enables a high stress retention to be realized due to the formation of such cross-linkages.

Examples of the radiation for irradiation include electromagnetic radiation such as γ-rays and X-rays, particle radiation such as an electron beam and β-rays, and the like. However, from the perspective of a better improvement effect in the tensile strength, elongation, stress at 500% elongation, stress retention, and the like of the obtained glove, γ-rays or an electron beam is preferable, and γ-rays are most preferable. The absorption dose of radiation, such as γ-rays, for irradiation is preferably in the range of 1 to 500 kGy, more preferably it the range of 5 to 300 kGy, and even more preferably in the range of 10 to 100 kGy. In addition, it is desirable to set the irradiation energy and time when performing γ-ray irradiation to appropriate conditions in consideration of a target absorption dose for the irradiation of radiation such as γ-rays and the resistance of the irradiated object to radiation such as γ-rays. The irradiation energy of radiation such as γ-rays may be in the range of 0.1 to 10 MeV. When cobalt 60 is the radiation source, the irradiated energy is preferably 1.17 MeV and 1.33 MeV, and when cesium 137 is the radiation source, the irradiated energy is desirably 0.66 MeV. The irradiation time of radiation such as γ-rays is the time necessary for obtaining the a target irradiation absorption dose of the radiation such as γ-rays, and hence is not particularly limited.

Thus, the glove obtained by the production method of the present invention has high tensile strength, large elongation, a supple texture, and high stress retention, and is therefore suitable as a glove to be used in various applications, in particular surgical gloves. Further, since the glove obtained by the production method of the present invention is substantially free of sulfur and/or a sulfur-containing compound as a cross-linking agent, in addition to immediate allergies (Type I), the glove can also effectively suppress the occurrence of delayed allergies (Type IV) caused by sulfur and sulfur-containing compounds, and from this point of view, the glove obtained by the production method of the present invention is suitable as a glove to be used in various applications.

EXAMPLES

The present invention is now described based on more detailed examples. However, the present invention is not limited to these examples. In the following, unless stated otherwise, "parts" is on a weight basis. In addition, the tests and evaluations were as follows.

Tensile Strength, Elongation at Break, and Stress at 500% Elongation

Dumbbell-shaped specimens were prepared from the rubber gloves as dip-molded articles obtained in the Examples and Comparative Examples by using a dumbbell (Die-C; manufactured by Dumbbell Co., Ltd.) according to ASTM D-412. Next, the obtained specimens were stretched at a stretching rate of 500 mm/min, and the tensile strength at break, the elongation at break, and the stress at 500% elongation were measured. The higher the tensile strength and elongation at break, the more preferable, and the smaller the stress at 500% elongation, the more flexible the texture is, which is preferable.

Stress Retention

Dumbbell-shaped specimens were prepared from the rubber gloves as dip-molded articles obtained in the Examples and Comparative Examples by using a dumbbell (Die-C; manufactured by Dumbbell Co., Ltd.) according to ASTM D-412. A tensile stress was applied to both ends of the specimens at a rate of 500 mm/min, and when a 20 mm standard section of the specimen had elongated by a factor of 2 (100%), the elongation was stopped and a tensile stress $M_{100}(0)$ was measured. Further, a tensile stress $M_{100}(6)$ after 6 minutes passed was also measured. The percentage of $M_{100}(6)$ relative to $M_{100}(0)$ (i.e., percentage of $M_{100}(6)/M_{100}(0)$) was taken as the stress retention. The greater the stress retention, the less susceptible the glove is to slackness (looseness or bagginess) when used, which is preferable.

Production Example 1 (Production of Latex of Carboxyl Group-Containing Nitrile Rubber (a1-1))

A pressure-resistant polymerization reaction vessel equipped with a stirrer was charged with 63 parts of 1.3-butadiene, 34 parts of acrylonitrile, 3 parts of methacrylic acid, 0.25 parts of t-dodecylmercaptan as a chain transfer agent, 132 parts of deionized water, 3 parts of sodium dodecylbenzene sulfonate, 1 part of sodium β-naphthalene sulfonic acid formalin condensate, 0.3 parts of potassium persulfate, and 0.005 part of sodium ethylenediamine tetraacetate, and polymerization was started while maintaining the polymerization temperature at 37° C. When the polymerization conversion ratio reached 70%, the polymerization temperature was raised to 43° C., and the reaction was continued until the polymerization conversion ratio reached 95%. Then, 0.1 parts of dimethyldithiocarbamate was added as a polymerization terminator to terminate the polymerization reaction. Then, from the latex of the obtained copolymer, unreacted monomer was removed by distillation under reduced pressure, and then the solid content concentration and pH were adjusted to obtain a latex of a carboxyl group-containing nitrile rubber (a1-1) having a solid content of 40% by weight and a pH of 8.0. The obtained carboxyl group-containing nitrile rubber (a1-1) had a composition of 63% by weight of the 1,3-butadiene unit, 34% by weight of the acrylonitrile unit, and 3% by weight of the methacrylic acid unit.

Production Example 2 (Production of Latex of Carboxyl Group-Containing Styrene-Butadiene Rubber (a2-1))

A pressure-resistant polymerization reaction vessel equipped with a stirrer was charged with 50 parts of deionized water, 0.3 parts of sodium dodecylbenzene sulfonate, 0.4 parts of t-dodecyl mercaptan, 63 parts of 1,3-butadiene, 34 parts of styrene, and 3 parts of methacrylic acid to obtain a monomer emulsion. A separate pressure-resistant polymerization reaction vessel equipped with a stirrer was charged with 40 parts of deionized water, 0.2 parts of sodium dodecylbenzenesulfonate, 0.35 parts of sodium bicarbonate, and 0.05 parts of sodium ethylenediamine tetraacetate, and the temperature was raised to 70° C. while stirring. Then, 0.5 parts of potassium persulfate was added to the mixture, and addition of the monomer emulsion obtained above was immediately started. The monomer emulsion was continuously added over 5 hours while stirring and mixing. After the addition of the monomer emulsion was complete, 0.2 parts of potassium persulfate was added in a 3 wt % aqueous solution. When the polymerization conversion ratio reached 90%, the temperature was raised to 85° C., and the reaction was continued for further 3 hours. When the polymerization conversion ratio reached 95%, 0.1 parts of sodium dimethyldithiocarbamate was added as a polymerization terminator to terminate the polymerization reaction. Then, from the latex of the obtained copolymer, unreacted monomer was removed by distillation under reduced pressure, and then the solid content concentration and pH were adjusted to obtain a latex of a carboxyl group-containing styrene-butadiene rubber (a2-1) having a solid content of 40% by weight and a pH of 8.0. The obtained carboxyl group-containing styrene-butadiene rubber (a2-1) had a composition of 63% by weight of the 1,3-butadiene unit, 34% by weight of the styrene unit, and 3% by weight of the methacrylic acid unit.

Production Example 3 (Latex of Carboxyl Group-Containing Butadiene Rubber (a3-1))

A pressure-resistant polymerization reaction vessel equipped with a stirrer was charged with 97 parts of 1,3-butadiene, 3 parts of methacrylic acid, 0.8 parts of t-dodecylmercaptan as a chain transfer agent, 132 parts of deionized water, 3 parts of sodium dodecylbenzene sulfonate, 1 part of sodium β-naphthalene sulfonic acid formalin condensate, 0.3 parts of potassium persulfate, and 0.005 part of sodium ethylenediamine tetraacetate, and polymerization was started while maintaining the polymerization temperature at 37° C. When the polymerization conversion ratio reached 70%, the polymerization temperature was raised to 43° C., and the reaction was continued until the polymerization conversion ratio reached 95%. Then, 0.1 parts of dimethyldithiocarbamate was added a polymerization terminator to terminate the polymerization reaction. Then, from the latex of the obtained copolymer, unreacted monomer was removed by distillation under reduced pressure, and then the solid content concentration and pH were adjusted to obtain a latex of a carboxyl group-containing butadiene rubber (a3-1) having a solid content of 40% by weight and a pH of 8.0. The obtained carboxyl group-containing butadiene (a3-1) had a composition of 97% by weight of the 1,3-butadiene unit and 3% by weight of the methacrylic acid unit.

Example 1

Preparation of Latex Composition

A mixed acquisition solution obtained by dissolving 0.2 parts of sodium aluminate, 0.4 parts of sorbitol, and 0.4 parts of sodium glycolate in water was added to 250 parts of the latex of the carboxyl group-containing nitrile rubber (a1-1) obtained in Production Example 1 (100 parts in terms of the carboxyl group-containing nitrile rubber (a1-1)). Then, deionized water was added thereto to adjust the solid content concentration to 30% by weight, whereby a latex composition was obtained.

Production of Dip-Molded Article (Glove)

An aqueous coagulant solution was prepared by mixing 30 parts of calcium nitrate, 0.05 parts of polyethylene glycol octylphenyl ether as a nonionic emulsifier, and 70 parts of water. Next, a ceramic glove mold pre-heated to 70° C. was immersed in the coagulant aqueous solution for 5 seconds, removed, and dried at a temperature of 70° C. for 10 minutes to adhere the coagulant to the glove mold. Then, the glove mold to which the coagulant was adhered was immersed in the latex composition obtained above for 10 seconds, removed, and immersed in warm water at 50° C. for 90 seconds to elute water-soluble impurities, and form a dip-molded layer in the glove mold.

Next, the glove mold having the dip-molded layer formed thereon was heat-treated at a temperature of 125° C. for 25 minutes to cross-link the dip-molded layer. The cross-linked dip-molded layer was then peeled off of the glove mold to obtain a pre-γ-ray irradiation dip-molded article. Next, using cobalt 60 as a radiation source, were the obtained pre-γ-ray irradiation dip-molded article was irradiated with γ-rays until the absorbed dose reached 30 kGy. The irradiation time was 3 hours. In this way, a dip-molded article (glove) after γ-ray irradiation was obtained. Then, the obtained dip-molded article (glove) after γ-ray irradiation was measured in accordance with the methods described above regarding tensile strength, elongation at break, and stress at 500% elongation. Further, stress retention was also measured in accordance with the method described above. The results are shown in Table 1.

Example 2

A latex composition having a solid content of 30% by weight was obtained in the same manner as Example 1, except that when preparing the latex composition, 250 parts of the latex of the carboxyl group-containing styrene-butadiene rubber (a2-1) obtained in Production Example 2 (100 parts in terms of the carboxyl group-containing styrene-butadiene rubber (a2-1)) was used instead of the latex of the carboxyl group-containing nitrile rubber (a1-1). The latex composition was then dip-molded and irradiated with γ-rays in the same manner as Example 1 to produce a dip-molded article (glove) after γ-ray irradiation. Evaluation was carried out in the same manner as Example 1. The results are shown in Table 1.

Example 3

A latex composition having a solid content of 30% by weight was obtained in the same manner as Example 1, except that when preparing the latex composition, 250 parts of the latex of the carboxyl group-containing butadiene rubber (a3-1) obtained in Production Example 3 (100 parts in terms of the carboxyl group-containing butadiene rubber (a3-1)) was used instead of the latex of the carboxyl group-containing nitrile rubber (a1-1). The latex composition was then dip-molded and irradiated with γ-rays in the same manner as Example 1 to produce a dip-molded article (glove) after γ-ray irradiation. Evaluation was carried out in the same manner as Example 1. The results are shown in Table 1.

Example 4

A latex composition having a solid content of 30% by weight was obtained in the same manner as Example 1, except that when preparing the latex composition, 1 part of zinc nitrate was further added. The latex composition was then dip-molded and irradiated with γ-rays in the same manner Example 1 to produce a dip-molded article (glove) after γ-ray irradiation. Evaluation was carried out in the same manner as Example 1. The results are shown in Table 1.

Example 5

A latex composition having a solid content of 30% by weight was obtained in the same manner as Example 1, except that when preparing the latex composition, sodium aluminate, sorbitol, and sodium glycolate were not added, and 1 part of zinc nitrate was added instead. The latex composition was then dip-molded and irradiated with γ-rays in the same manner as Example 1 to produce a dip-molded article (glove) after γ-ray irradiation. Evaluation was carried out in the same manner as Example 1. The results are shown in Table 1.

Comparative Example 1

A latex composition having a solid content of 30% by weight was obtained in the same manner as Example 1, except that when preparing the latex composition, 3 parts of sulfur and 1.5 parts of zinc dibutyl dithiocarbamate were further added. The latex composition was then dip-molded and irradiated with γ-rays in the same manner as Example 1 to produce a dip-molded article (glove) after γ-ray irradiation. Evaluation was carried out in the same manner as Example 1. The results are shown in Table 1.

Comparative Example 2

A latex composition having a solid content of 30% weight was obtained in the same manner as Comparative Example 1, except that when preparing the latex composition, 1 part of zinc nitrate was further added. The latex composition was then dip-molded and irradiated with γ-rays in the same manner as Example 1 to produce a dip-molded article (glove) after γ-ray irradiation. Evaluation was carried out in the same manner as Example 1. The results are shown in Table 1.

Comparative Example 3

A dip-molded article (glove) was produced and evaluated in the same manner Example 1 using a latex composition having a solid content of 30% by weight obtained in the same manner as Example 1, except that γ-ray irradiation was not carried out. The results are shown in Table 1.

Comparative Example 4

A dip-molded article (glove) was produced and evaluated in the same manner as Example 2 using a latex composition having a solid content of 30% by weight obtained in the same manner as Example 1, except that γ-ray irradiation was not carried out. The results are shown in Table 1.

Comparative Example 5

A dip-molded article (glove) was produced and evaluated in the same manner as Example 3 using a latex composition having a solid content of 30% by weight obtained in the same manner as Example 1, except that γ-ray irradiation was not carried out. The results are shown in Table 1.

Comparative Example 6

A dip-molded article (glove) was produced and evaluated in the same manner as Example 4 using a latex composition having a solid content of 30% by weight obtained in the same manner as Example 1, except that γ-ray irradiation was not carried out. The results are shown in Table 1.

Comparative Example 7

A dip-molded article (glove) was produced and evaluated in the same manner as Example 5 using a latex composition having a solid content of 30% by weight obtained in the same manner as Example 1, except that γ-ray irradiation was not carried out. The results are shown in Table 1.

TABLE 1

| | | Example 1 | Example 2 | Example 3 | Example 4 | Example 5 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|---|
| Composition of Latex Composition | | | | | | | | | | | | | |
| Carboxyl Group-Containing Nitrile Rubber (a1-1) | parts | 100 | — | — | 100 | 100 | 100 | 100 | 100 | — | — | 100 | 100 |
| Carboxyl Group-Containing Styrene-Butadiene Rubber (a2-1) | parts | — | 100 | — | — | — | — | — | — | 100 | — | — | — |
| Carboxyl Group-Containing Butadiene Rubber (a3-1) | parts | — | — | 100 | — | — | — | — | — | — | 100 | — | — |
| Sodium Aluminate | parts | 0.2 | 0.2 | 0.2 | 0.2 | — | 0.2 | 0.2 | 0.2 | 0.2 | 0.2 | 0.2 | — |
| Zinc Oxide | parts | — | — | — | 1.0 | 1.0 | — | 1.0 | — | — | — | 1.0 | 1.0 |
| Sulfur | parts | — | — | — | — | — | 3.0 | 3.0 | — | — | — | — | — |
| Zinc Dibutyldithiocarbamate | parts | — | — | — | — | — | 1.5 | 1.5 | — | — | — | — | — |
| Sorbitol | parts | 0.4 | 0.4 | 0.4 | 0.4 | — | 0.4 | 0.4 | 0.4 | 0.4 | 0.4 | 0.4 | — |
| Sodium Glycolate | parts | 0.4 | 0.4 | 0.4 | 0.4 | — | 0.4 | 0.4 | 0.4 | 0.4 | 0.4 | 0.4 | — |
| With or Without γ-Ray Irradiation | | Yes | Yes | Yes | Yes | Yes | Yes | Yes | No | No | No | No | No |
| Evaluation of Dip-Molded Article (glove) | | | | | | | | | | | | | |
| Tensile Strength | (Mpa) | 22.2 | 18.5 | 19.5 | 33.2 | 35.5 | 16.6 | 18.5 | 17.0 | 13.5 | 12.5 | 34.5 | 32.5 |
| Elongation at Break | (%) | 700 | 660 | 650 | 620 | 630 | 580 | 530 | 780 | 740 | 850 | 670 | 690 |
| Stress at 500% Elongation | (Mpa) | 6.4 | 7.6 | 8.2 | 8.1 | 11.5 | 8.5 | 11.5 | 3.6 | 4.8 | 3.0 | 9.8 | 9.2 |
| Stress Retention | (%) | 73 | 67 | 75 | 70 | 67 | 62 | 62 | 62 | 58 | 56 | 60 | 50 |

From Table 1, the following can be confirmed.

Specifically, from a comparison of Examples 1 to 5 with Comparative Examples 3 to 7, it can be confirmed that irradiating a dip-molded article obtained using a latex composition that contains a latex of a carboxyl group-containing conjugated diene rubber (A) and a metal compound (B) including a divalent or higher metal, and that is substantially free from sulfur and/or a sulfur-containing compound as a cross-linking agent to γ-rays enables a large improvement in tensile strength and the stress retention while maintaining a large elongation at break and a supple texture (small stress at 500% elongation). In other words, according to the present invention, it is possible to improve the strength required for gloves, and the occurrence of slackness (looseness or bagginess) when the glove is used can be appropriately prevented.

On the other hand, as shown in Comparative Examples 1 and 2, when sulfur or a sulfur-containing compound (zinc dibutyldithiocarbamate) as a cross-linking agent is added, there was almost no improvement effect on tensile strength or stress retention as a result of γ-ray irradiation.

The invention claimed is:

1. A method for producing a glove, comprising:
    forming a dip molded layer by dip-molding a latex composition comprising a latex of a carboxyl group-containing conjugated diene rubber (A) and a metal compound (B) comprising a divalent or higher metal, and is substantially free from sulfur and/or a sulfur-containing compound as a cross-linking agent; and
    irradiating the dip-molded layer with γ-rays so as to cross-link a carbon-carbon double bond moiety of a conjugated diene monomer unit of the carboxyl group-containing conjugated diene rubber (A).

2. The method for producing a glove according to claim 1, wherein the carboxyl group-containing conjugated diene rubber (A) is at least one selected from a carboxyl group-containing nitrile rubber (a1), a carboxyl group-containing styrene-butadiene rubber (a2), and a carboxyl group-containing butadiene rubber (a3).

3. The method for producing a glove according to claim 1, wherein the metal compound (B) comprising a divalent or higher metal comprises a metal compound including a trivalent or higher metal.

4. The method for producing a glove according to claim 1, wherein as the metal compound (B) comprising a divalent or higher metal, both of a metal compound comprising a trivalent or higher metal and a metal compound including a divalent metal are used.

5. The method for producing a glove according to claim 3, wherein the metal compound comprises a trivalent or higher metal is an aluminum compound.

6. The method for producing a glove according to claim 3, wherein the latex composition further comprises at least one alcoholic hydroxyl group-containing compound (C) selected from a saccharide (c1), a sugar alcohol (c2), a hydroxy acid (c3), and a hydroxy acid salt (c4).

7. The method for producing a glove according to claim 1, wherein the metal compound (B) comprising a divalent or higher metal has a content in the latex composition of 0.1 to 5 parts by weight, based on 100 parts by weight of the carboxyl group-containing conjugated diene rubber (A) included in the latex.

8. The method for producing a glove according to claim 1, wherein the irradiating is performed so that the absorption dose of radiation for irradiation is in a range of 1 to 500 kGy.

9. The method for producing a glove according to claim 1, wherein the irradiating is performed so that the absorption dose of radiation for irradiation is in a range of 5 to 300 kGy.

10. The method for producing a glove according to claim 1, wherein the irradiating is performed so that the absorption dose of radiation for irradiation is in a range of 10 to 100 kGy.

11. The method for producing a glove according to claim 1, wherein the latex composition further comprises at least one alcoholic hydroxyl group-containing compound (C) selected from a sugar alcohol (c2) and a hydroxy acid salt (c4).

* * * * *